(12) United States Patent
Menendez

(10) Patent No.: US 7,773,882 B2
(45) Date of Patent: *Aug. 10, 2010

(54) OPTICAL CODE-ROUTED NETWORKS

(75) Inventor: Ronald Charles Menendez, Chatham, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1066 days.

This patent is subject to a terminal disclaimer.

(21) Appl. No.: 11/137,938

(22) Filed: May 26, 2005

(65) Prior Publication Data
US 2007/0003290 A1 Jan. 4, 2007

(51) Int. Cl.
H04J 14/00 (2006.01)
(52) U.S. Cl. .............. 398/78; 398/77; 398/61; 398/49; 398/63; 370/92; 370/93; 370/18; 370/19; 375/25; 375/68; 385/24; 385/37; 385/16; 385/17; 385/18
(58) Field of Classification Search ............ 398/77, 398/78, 70, 71, 72, 135, 61, 62, 63, 64, 190, 398/191, 100, 182, 183, 202, 87, 99, 79, 398/45, 49, 50, 55, 56, 57; 385/24, 37, 16, 385/17, 18; 370/93, 18, 19, 92; 375/25, 375/68
See application file for complete search history.

(56) References Cited
U.S. PATENT DOCUMENTS

| | | | |
|---|---|---|---|
| 4,779,265 A * | 10/1988 | O'Connor et al. | 370/441 |
| 4,779,266 A | 10/1988 | Chung et al. | |
| 4,866,699 A | 9/1989 | Brackett et al. | |
| 5,519,526 A * | 5/1996 | Chua et al. | 398/139 |
| 6,236,483 B1 * | 5/2001 | Dutt et al. | 398/141 |
| 6,295,302 B1 * | 9/2001 | Hellwig et al. | 370/522 |
| 6,608,721 B1 | 8/2003 | Turpin et al. | |
| 6,614,950 B2 * | 9/2003 | Huang et al. | 385/15 |
| 2004/0264695 A1 | 12/2004 | Turpin | |
| 2005/0226615 A1 * | 10/2005 | Chu et al. | 398/78 |
| 2006/0074644 A1 * | 4/2006 | Suzuki et al. | 704/223 |
| 2006/0171722 A1 * | 8/2006 | Toliver | 398/188 |
| 2007/0036553 A1 * | 2/2007 | Etemad et al. | 398/140 |
| 2007/0280697 A1 * | 12/2007 | Menendez | 398/140 |

OTHER PUBLICATIONS

Z. Li et al., "Simulation of Mode-locked Ring Laser Based on Nonlinear Polarization Rotation in a Semiconductor Optical Amplifier", in Proc. ICTON 2004, Warsaw, Poland, Jul. 2004, pp. 318-321.

* cited by examiner

Primary Examiner—Hanh Phan
(74) Attorney, Agent, or Firm—Philip J. Feig

(57) ABSTRACT

Communication is provided between at least two of a plurality of stations. A signal is received from a first one of the plurality of stations, and the signal is coded using a first code that is assigned to that station. The coded signal is converted to obtain a further coded signal that is decodable using a further code that is assigned to at least a second one of the plurality of stations. The further coded signal is transmitted for delivery to at least the second one of the plurality of stations.

18 Claims, 10 Drawing Sheets

100

PRIOR ART

OPTICAL CODE-ROUTED NETWORKS

CROSS-REFERENCE TO RELATED APPLICATIONS

This application is related to U.S. application Ser. No. 11/062,090 (Telcordia APP No. 1554/TELCOR 1.0-010), filed Feb. 18, 2005 and titled "Phase-Chip Frequency-Bins Optical CDMA", and in U.S. application Ser. No. 11/048,394 (Telcordia APP No. 1548/TELCOR 1.0-003), filed Jan. 31, 2005 and titled "Multi-Wavelength Optical CDMA With Differential Encoding And Bipolar Differential Detection", both assigned to the assignee of the present application, the disclosures of which are incorporated herein by reference.

BACKGROUND OF THE INVENTION

The present invention relates to optical communication and, more particularly, to optical code division multiple access (OCDMA) communication in which signals encoded with a given code may be shifted to another code.

Various communications schemes have been used to increase data throughput and to decrease data error rates as well as to generally improve the performance of communications channels. As an example, frequency division multiple access ("FDMA") employs multiple data streams that are assigned to specific channels disposed at different frequencies of the transmission band. Alternatively, time division multiple access ("TDMA") uses multiple data streams that are assigned to different timeslots in a single frequency of the transmission band. However, FDMA and TDMA are quite rigid in the number of users and/or the data rates that can be supported for a given transmission band.

In many communication architectures, code division multiple access (CDMA) has supplanted FDMA and TDMA. CDMA is a form of spread spectrum communications that enables multiple data streams or channels to share a single transmission band at the same time. The CDMA format is akin to a cocktail party in which multiple pairs of people are conversing with one another at the same time in the same room. Ordinarily, it is very difficult for one party in a conversation to hear the other party if many conversations occur simultaneously. For example, if one pair of speakers is excessively loud, their conversation will drown out the other conversations. Moreover, when different pairs of people are speaking in the same language, the dialogue from one conversation may bleed into other conversations of the same language, causing miscommunication. In general, the cumulative background noise from all the other conversations makes it harder for one party to hear the other party speaking. It is therefore desirable to find a way for everyone to communicate at the same time so that the conversation between each pair, i.e., their "signal", is clear while the "noise" from the conversations between the other pairs is minimized.

The CDMA multiplexing approach is well known and is explained in detail, e.g., in the text "CDMA: Principles of Spread Spectrum Communication," by Andrew Viterbi, published in 1995 by Addison-Wesley. Basically, in CDMA, the bandwidth of the data to be transmitted (user data) is much less than the bandwidth of the transmission band. Unique "pseudonoise" keys are assigned to each channel in a CDMA transmission band. The pseudonoise keys are selected to mimic Gaussian noise (e.g., "white noise") and are also chosen to be maximal length sequences in order to reduce interference from other users/channels. One pseudonoise key is used to modulate the user data for a given channel. This modulation is equivalent to assigning a different language to each pair of speakers at a party.

During modulation, the user data is "spread" across the bandwidth of the CDMA band. That is, all of the channels are transmitted at the same time in the same frequency band. This is equivalent to all of the pairs of partygoers speaking at the same time. The introduction of noise and interference from other users during transmission is inevitable (collectively referred to as "noise"). Due to the nature of the pseudonoise key, the noise is greatly reduced during demodulation relative to the user's signal because when a receiver demodulates a selected channel, the data in that channel is "despread" while the noise is not "despread". Thus, the data is returned to approximately the size of its original bandwidth, while the noise remains spread over the much larger transmission band. The power control for each user can also help to reduce noise from other users. Power control is equivalent to lowering the volume of a loud pair of partygoers.

CDMA has been used commercially in wireless telephone ("cellular") and in other communications systems. Such cellular systems typically operate at between 800 MHz and 2 GHz, though the individual frequency bands may only be a few MHz wide. An attractive feature of cellular CDMA is the absence of any hard limit to the number of users in a given bandwidth, unlike FDMA and TDMA. The increased number of users in the transmission band merely increases the noise to contend with. However, as a practical matter, there is some threshold at which the "signal-to-noise" ratio becomes unacceptable. This signal-to-noise threshold places real constraints in commercial systems on the number of paying customers and/or data rates that can be supported.

Recently, CDMA has been used in optical communications networks. Such optical CDMA (OCDMA) networks generally employ the same general principles as cellular CDMA. However, unlike cellular CDMA, optical CDMA signals are delivered over an optical network. As an example, a plurality of subscriber stations may be interconnected by a central hub with each subscriber station being connected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. An optical pulse is transmitted to a selected one of a plurality of potential receiving stations by coding the pulse in a manner such that it is detectable by the selected receiving station but not by the other receiving stations. Such coding may be accomplished by dividing each pulse into a plurality of intervals known as "chips". Each chip may have the logic value "1", as indicated by relatively large radiation intensity, or may have the logic value "0", as indicated by a relatively small radiation intensity. The chips comprising each pulse are coded with a particular pattern of logic "1"'s and logic "0"'s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, the optical network utilizes CDMA that is based on optical frequency domain coding and decoding of ultra-short optical pulses. Each of the transmitters includes an optical source for generating the ultra-short optical pulses. The pulses comprise Fourier components whose phases are coherently related to one another. A "signature" is impressed upon the optical pulses by independently phase shifting the individual Fourier components comprising a given pulse in accordance with a particular code whereby the Fourier components comprising the pulse are each phase shifted a different amount in accordance with the particular code. The encoded pulse is then broadcast to all of or a plurality of the receiving systems in the network. Each receiving system is identified by a unique signature template and detects only the pulses provided with a signature that matches the particular receiving system's template.

The known optical CDMA networks that use chip patterns or phase coding, however, require that the encoding applied at the transmitter be matched to the decoding applied at the desired receiver in order for the receiver to extract the coded signals sent by the transmitter. As a result, random interconnections between a given transmitter and a given receiver are not possible.

FIG. 1 depicts, in block diagram form, a known multiple user system 100. Such a system is described in U.S. Pat. No. 4,779,266, issued Oct. 18, 1988 to Fan R. K. Chung, et al. and titled "Encoding And Decoding For Code Division Multiple Access Communication Systems", the disclosure of which is incorporated herein by reference.

The multiple user system 100 includes M sources 101, . . . ,103 that are arranged to communicate with N receivers 111,112, . . . ,113 over an interposed optical channel 141. The sources 101,102, . . . ,103 are coupled to the channel 141 via electro-optical encoders 121,122, . . . ,123. At the receiving end, electro-optical decoders 131,132, . . . ,133 couple the channel signals to the receivers 111,112, . . . ,113, respectively. Each encoder 121,122, . . . ,123, besides performing an encoding function, also converts electrical input signals to optical output signals. Similarly, each decoder 131, 132, . . . ,133, in addition to its decoding function, also converts optical input signals to electrical output signals. The optical portion of system 100 is shown generally as between the dashed lines that intersect, respectively, the encoder blocks and the decoder blocks.

The optical channel 141 propagates only two-level or two-state digital signals, such as a logic "0" (a "space") and a logic "1" (a "mark"). To match this channel characteristic, signals emanating from encoders 121, . . . ,123 via leads 151, . . . ,153, designated by signature signals $S_i$, where i=1, . . . ,M, respectively, provide a stream of two-level or mark and space signals. Each $S_i$ stream corresponds to a similar stream produced by a particular one of the sources 101, . . . ,103. Because the channel 141 only supports two-level signals, if one or more of the encoders 121, . . . ,123 propagates logic "1" signals over channel 141 during the same time duration, the channel level remains at logic "1". The channel level is at logic "0" if all the $S_i$ outputs are "0" during the same duration. In a logical sense, channel 141 behaves as an "inclusive OR" channel.

The composite signal on channel 141 resulting from all of the $S_i$'s is the summation of all the $S_i$'s and is represented by $S_O$, where the summation is treated in the "inclusive OR" sense. Each lead 161, . . . ,163 emanating from the channel 141 serves as an input to the decoders 131, . . . ,133 and provides the composite signal $S_O$. Thus, all the signatures $S_i$ share substantially the same frequency band on channel 141.

Generally, each signature signal $S_i$ is unconstrained in time in that each source 101, . . . ,103 may initiate a transmission or an interchange of information at any time independent of the other sources. Thus, synchronization between or among the autonomous sources 101, . . . ,103 is not required. However, each of the encoders 121, . . . ,123 is in synchronism with its corresponding source 101, . . . ,103.

Typically, one or more of the decoders 131, . . . ,133 are in synchronism with a predetermined encoder 121, . . . ,123. Each encoder may "train" its associated decoder using any known training techniques to provide the requisite synchronization. Additionally, synchronization between or among the autonomous decoders 131, . . . ,133 is not required, but each receiver 111, . . . ,113 is synchronized with its associated decoder.

The primary function of the encoders 121, . . . ,123 is to convert each logic "1" received from each corresponding source 101, . . . ,103 to a predetermined rate-increased stream of logic "1"s and logic "0"s, as depicted generically in FIG. 2. Line (i) of FIG. 2 depicts three contiguous data bits, namely, a "mark-space-mark" sequence, e.g., appearing in the output stream of source 101 or in the input stream to encoder 121. The time interval of either a mark or space is designated as a bit duration. Line (ii) of FIG. 2 represents an output pulse stream, e.g., $S_i$ from encoder 121, corresponding to the line (i) input stream. A rate-increased stream of logic "1" and logic "0" pulses, which is replicated for all other marks produced by the source 101, is generated by encoder 121. Because the channel 141 is an optical medium, the logic "1" levels in the output stream $S_i$ correspond to light pulses.

In the rate-increased or optical portion of the system 100, a frame corresponds to a bit duration, and the time interval of a logic "1" (a light pulse) or a logic "0" (no light pulse) is designated as the chip duration. Thus, each frame is composed of a fixed number of "chips", e.g., three logic "1" chips occur during each mark frame in FIG. 2. The envelope of the mark frames is shown by the dashed rectangles on line (ii) of FIG. 2.

To communicate effectively within the system 100, each signature $S_i$, as produced by its assigned encoder in response to an input mark, may not be selected arbitrarily but must be carefully chosen to achieve efficient, error-free communication. Specifically, each $S_i$ must be selected in view of all the other $S_i$'s based on considerations such as the number of sources M and the bandwidth of the channel 141. The considerations, in turn, depend on the communication or system requirements or the transmission characteristics.

Each of the decoders 131, . . . ,133 discriminates the pre-assigned signature associated with that decoder from within the composite signal $S_O$. As an example, each of the decoders 131, . . . ,133 may be implemented using optical tapped delay lines arranged along channel the 141. The optical separation between the taps of each decoder corresponds to the distribution of logic "1" chips in the signature that is pre-assigned to that decoder. Thus, whenever a mark is transmitted, each tap in a given decoder extracts a high-peak signal when the logic "1" chips in the pre-assigned signature propagating as part of $S_O$ are aligned with the taps. In this way, a "peak correlation" reveals the arrival of the pre-assigned signature and, in turn, the propagation of a mark by the source having the same pre-assigned signature.

The known optical system of FIGS. 1-2 has the disadvantage that in order for a given one of the M sources 101, . . . ,103 to communicate with one or more of the N receivers 111, . . . ,113, the pre-assigned signature associated with its corresponding decoder 131, . . . ,133 must be generated by the encoder 121, . . . ,123 corresponding to the given transmitter. As a result, random interconnections between a given source and a given receiver are not possible.

It therefore desirable to provide an optical CDMA system in which signals encoded by a given transmitter may be readily converted to another code so that the coded signals may be decoded by a desired receiver whose decoding is not matched to the transmitter.

SUMMARY OF THE INVENTION

In accordance with an aspect of the invention, a method provides communication between at least two of a plurality of stations. A signal is received from a first one of the plurality of stations, the signal being coded using a first code that is associated with the first one of the plurality of stations. The coded signal is converted to obtain a further coded signal that is decodable using a further code that is associated with at least a second one of the plurality of stations. The further coded signal is transmitted for delivery to at least the second one of the plurality of stations.

In accordance with the above method, the first code may be one of a plurality of codes, the further code may be another of the plurality of codes, the plurality of codes may be a closed set under multiplication whereby multiplication of the first code by a specific one of the plurality of codes results in the further code, and the converting of the coded signal may include using the specific one of the plurality of codes to obtain the further coded signal. The plurality of codes may be the set of Hadamard codes.

The first code and the further code may be orthogonal codes, and the coded signal and the further coded signal may be code division multiple access (CDMA) signals. The coded signal and the further coded signal may be modulated optical signals formed of optical pulses that are comprised of a plurality of discrete frequencies within a specific range of frequencies, and the converting of the coded signal may include changing the phase of at least one of the plurality of discrete frequencies in the optical pulses of the coded signal to obtain the further coded signal. The further coded signal may be decoded at the second one of the plurality of stations using the further code.

In accordance with another aspect of the invention, an apparatus provides communication between at least two of a plurality of stations. An adjustable coder is operable to receive a signal from a first one of the plurality of stations, the signal being coded using a first code that is associated with the first one of the plurality of stations. The adjustable coder is also operable to convert the coded signal to obtain a further coded signal that is decodable using a further code that is associated with at least a second one of the plurality of stations, and to transmit the further coded signal for delivery to at least the second one of the plurality of stations.

In accordance with the above apparatus, the first code may be one of a plurality of codes, the further code may be another of the plurality of codes, the plurality of codes may be a closed set under multiplication whereby multiplication of the first code by a specific one of the plurality of codes results in the further code, and the adjustable coder may be operable to convert the coded signal using the specific one of the plurality of codes to obtain the further coded signal. The plurality of codes may be the set of Hadamard codes.

The first code and the further code may be orthogonal codes, and the coded signal and the further coded signal may be code division multiple access (CDMA) signals. The coded signal and the further coded signal may be modulated optical signals formed of optical pulses that are comprised of a plurality of discrete frequencies within a specific range of frequencies, and the adjustable coder may be operable to convert the coded signal by changing the phase of at least one of the plurality of discrete frequencies in the optical pulses of the coded signal to obtain the further coded signal.

A communication system of the invention may include a plurality of stations, a central hub, a plurality of communication paths that are each associated with a given one of the plurality of stations and that are operable to connect that station with the central hub, the central hub being operable to provide a connection between at least two of the plurality of stations via the associated communication paths, and a plurality of adjustable coders that are each associated with a specific one of the plurality of stations and that are disposed in the communication path between that station and the central hub, at least one of the plurality of adjustable coders being the above-described apparatus.

In accordance with the above communication system, the first one of the plurality of stations may be operable to generate the coded signal using the first code, and the second one of the plurality of stations may be operable to decode the further coded signal using the further code.

The first code may be one of a plurality of codes, the further code may be another of the plurality of codes, the plurality of codes may be a closed set under multiplication whereby multiplication of the first code by a specific one of the plurality of codes results in the further code, and the adjustable coder may be operable to convert the coded signal using the specific one of the plurality of codes to obtain the further coded signal. The plurality of codes may be the set of Hadamard codes.

The first code and the further code may be orthogonal codes, and the coded signal and the further coded signal may be code division multiple access (CDMA) signals. The coded signal and the further coded signal may be modulated optical signals formed of optical pulses comprised of a plurality of discrete frequencies within a specific range of frequencies, and the adjustable coder may be operable to convert the coded signal by changing the phase of at least one of the plurality of discrete frequencies in the optical pulses of the coded signal to obtain the further coded signal.

Another communication system of the invention includes a plurality of stations, at least one of the plurality of stations including a coder and at least another of the plurality of stations including a decoder, a central hub, and a plurality of communication paths that are each associated with a given one of a plurality of stations and that are operable to connect that station with the central hub, the central hub being operable to provide a connection between at least one of the plurality of stations and the at least another of the plurality of stations via the associated communication paths. At least one of the coder and the decoder is tunable. When the coder is tunable, the coder is an adjustable coder that is operable to tune to the at least another of the plurality of stations to thereby generate a first coded signal using a first code that is associated with the at least another of the plurality of stations. When the decoder is tunable, the decoder is an adjustable decoder that is operable to tune to the at least one of the plurality of stations to thereby decode the further coded signal generated by the at least one of the plurality of stations using a further code that is associated with the at least one of the plurality of stations.

In accordance with this communication system, the first code may be one of a set of Hadamard codes, the further code is another of the set of Hadamard codes, a set of Hadamard codes being a closed set under multiplication whereby multiplication of the first code by a specific one of the set of Hadamard codes results in the further code, and the coded signal and the further coded signal may be code division multiple access (CDMA) signals.

The coded signal and the further coded signal may be modulated optical signals formed of optical pulses comprised of a plurality of discrete frequencies within a specific range of frequencies, the adjustable coder may be operable to generate the coded signal by changing the phase of at least one of the plurality of discrete frequencies in the optical pulses of a non-coded signal, and the adjustable decoder may be operable to decode the further coded signal by changing the phase of at least one of the plurality of discrete frequencies in the optical pulses of the further coded signal.

The foregoing aspects, features and advantages of the present invention will be further appreciated when considered with reference to the following description of the preferred embodiments and accompanying drawings.

DETAILED DESCRIPTION

Figure 1:
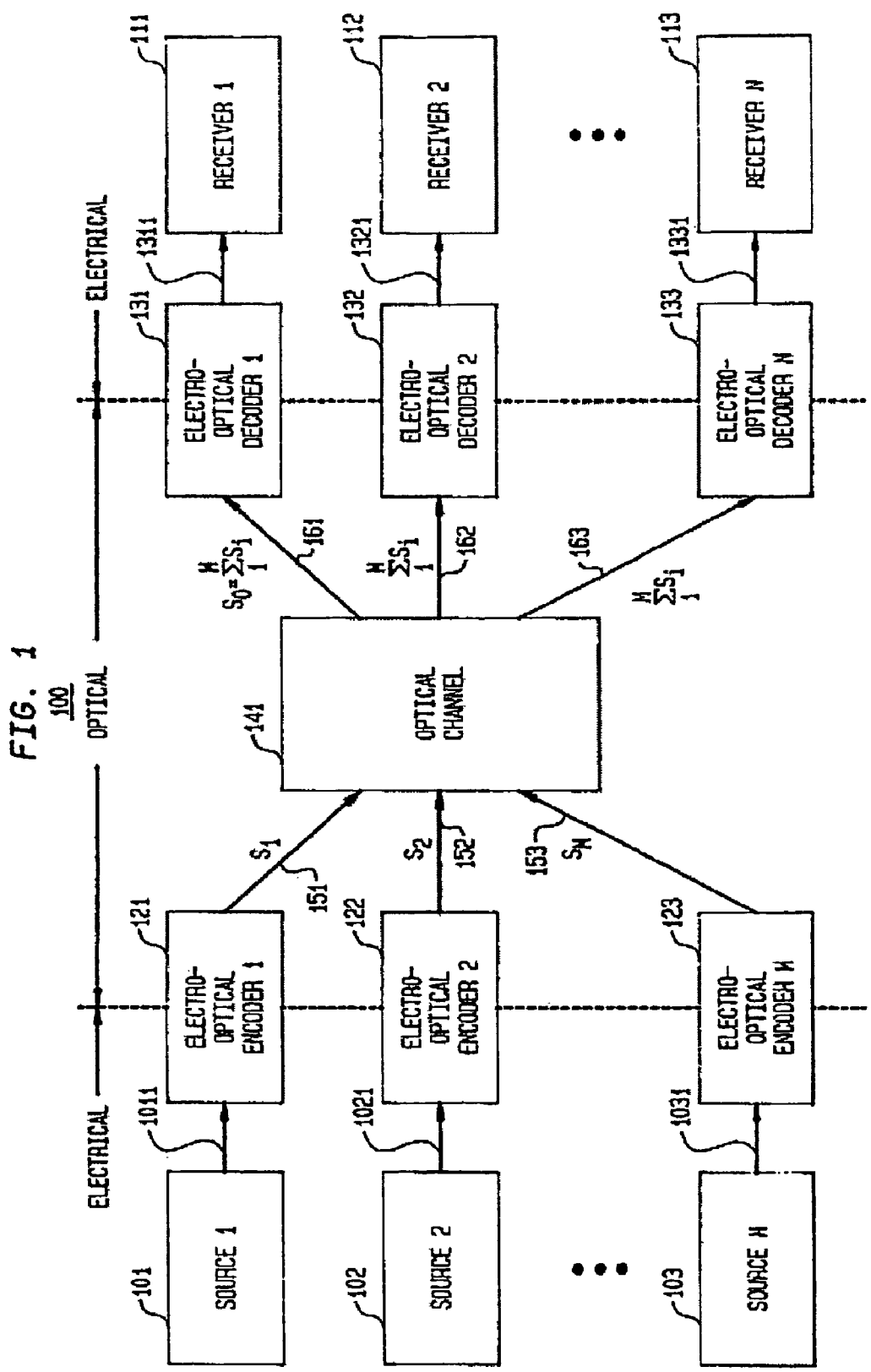
FIG. 1 depicts, in block diagram form, a known electro-optical communications network.
Figure 2:
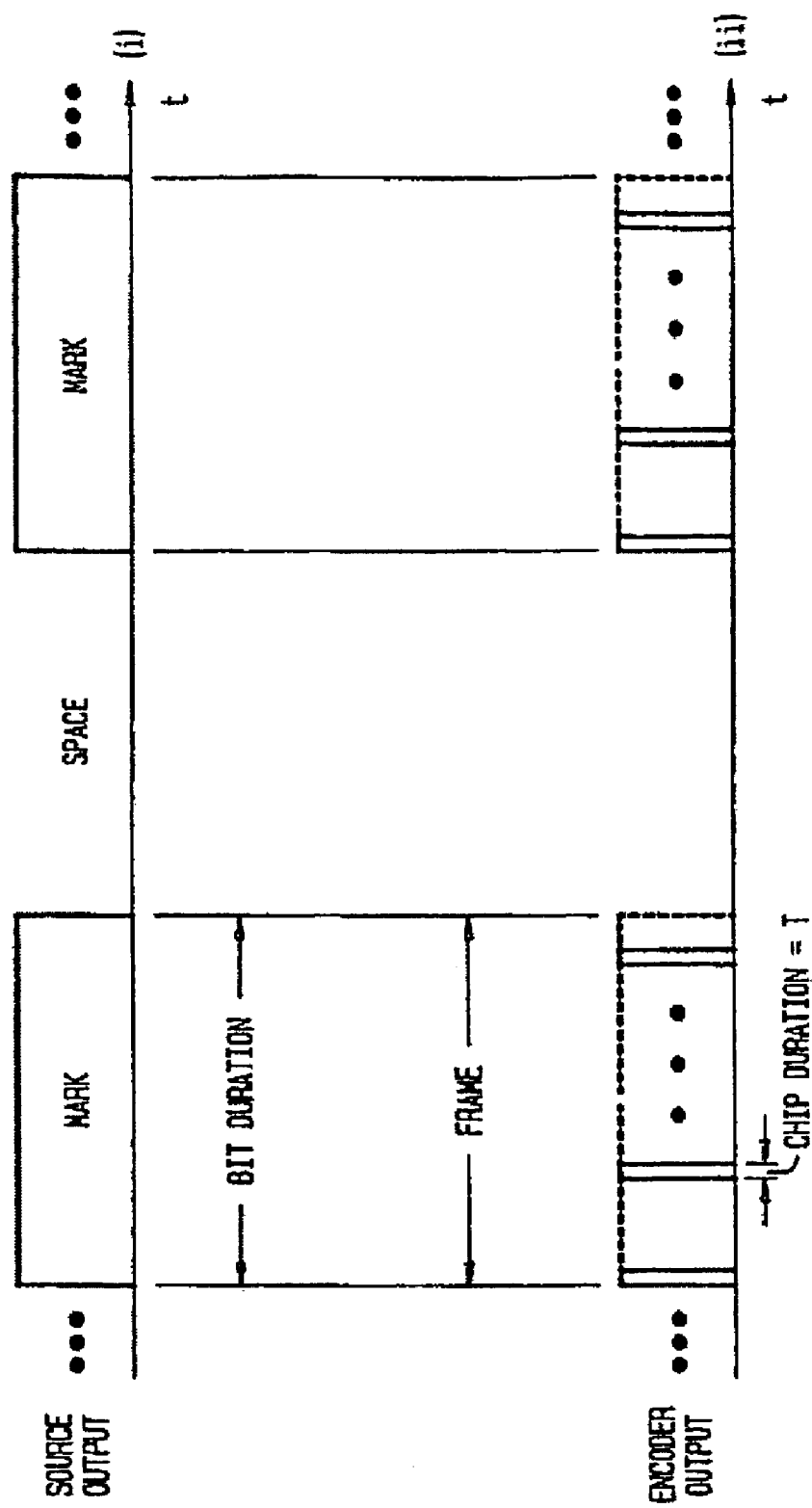
FIG. 2 depicts the relationship between the incoming electrical signal and the rate-increased optical signal propagated by any of the encoders of FIG. 1.
Figure 3:
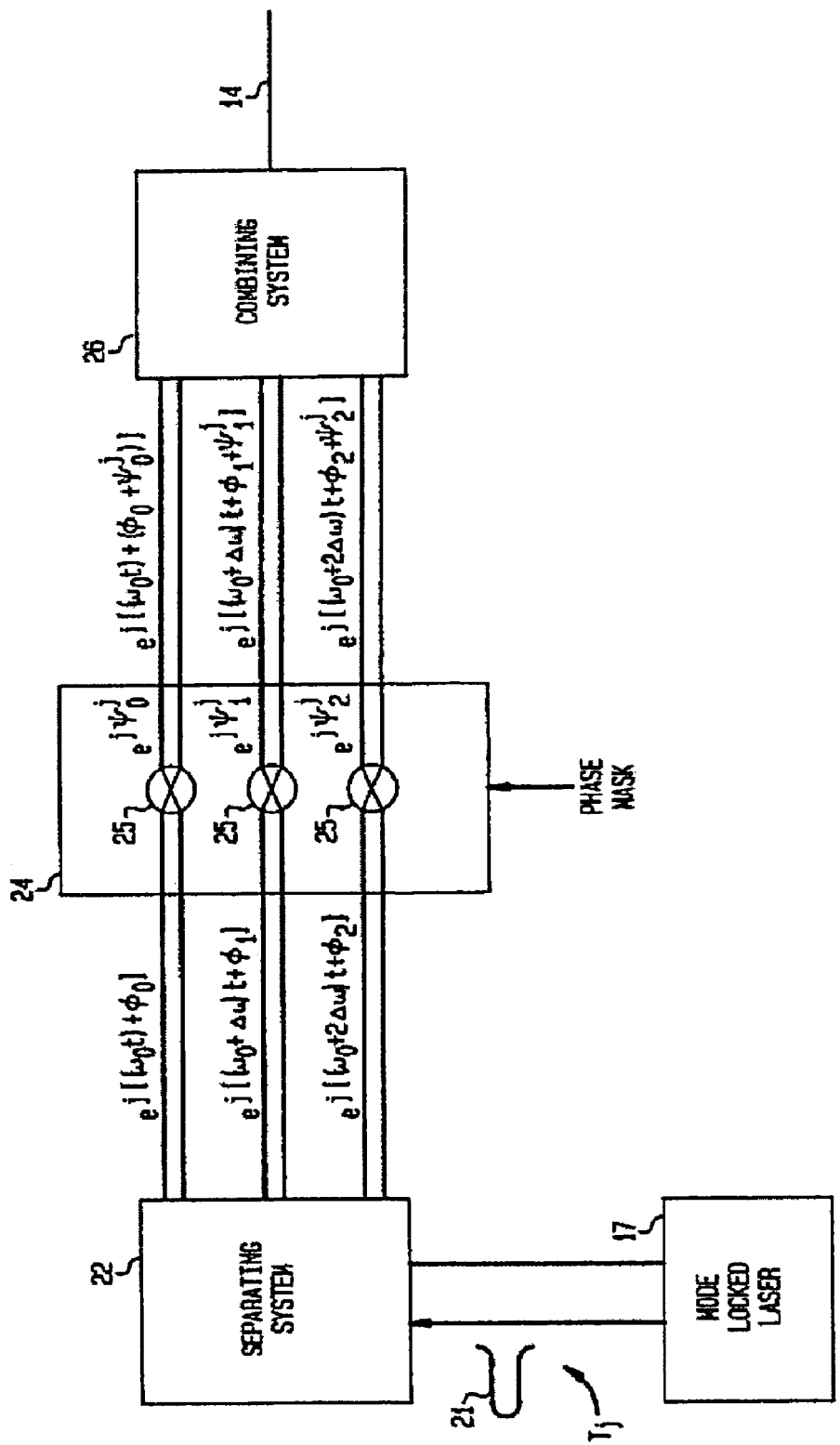
FIG. 3 is a block diagram illustrating a known transmitting system comprising part of an optical communications network.

FIG. 3 schematically illustrates an example of a known transmitting system Tj. Optical pulses 21 are generated by a mode locked laser source 17. Each optical pulse 21 from the laser 17 is transmitted to a separating system 22 that spatially separates each optical pulse into its Fourier components. The individual Fourier components are then individually phase shifted in accordance with a predetermined code utilizing the phase mask 24. The individual Fourier components are then spatially recombined using combining system 26 for transmission out over the optical fiber 14 to the receiving systems in the network. In this way an address or "key" is encoded into each pulse.

Alternatively, the optical system may set up communication between specific subscriber stations by phase modulating the Fourier components of radiation pulses produced at a first specific subscriber station according to a predetermined code that is chosen so that the phase modulated radiation pulses can be detected only in a second specific subscriber station. Such a system is described in U.S. Pat. No. 4,866,699, issued Sep. 12, 1989 to Charles A. Brackett, et al. and titled "Optical Telecommunications System Using Code Division Multiple Access", the disclosure of which is incorporated herein by reference.

Figure 4:
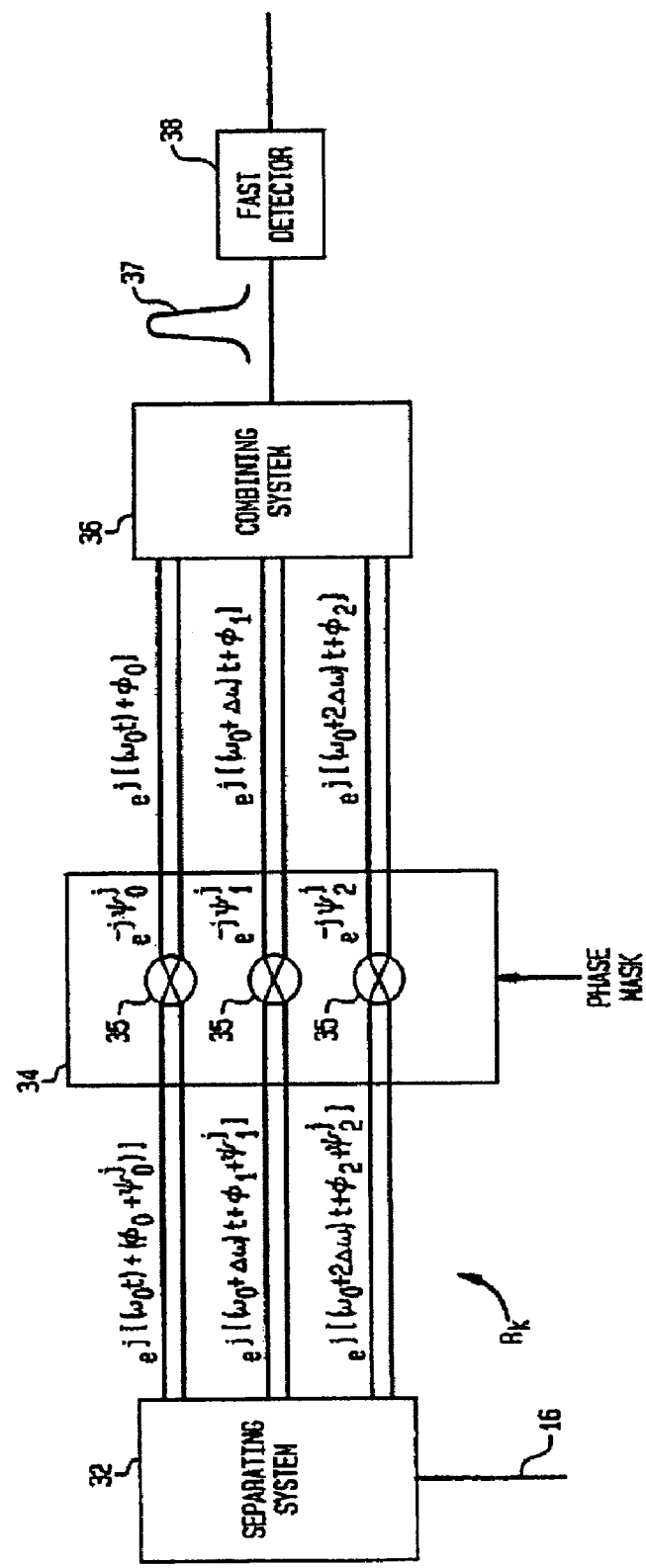
FIG. 4 is a block diagram illustrating a known receiving system comprising part of the optical communications network that includes the known transmitting system of FIG. 3.

FIG. 4 shows a receiving system Rk intended to receive and detect the pulses produced by the transmitting system Tj shown in FIG. 3. Radiation from a plurality of transmitting stations is received at the receiver Rk and is broken into Fourier components by a separating system 32. The Fourier components are then individually phase shifted by a phase mask 34 defines a "lock" for the receiving system Rk. The phase shifted Fourier components are then recombined using a combining system 36. Fourier components that are encoded with the right "key" are recombined into a narrow pulse which is detected by a threshold detector 38. Fourier components that are encoded with other "keys" are recombined into a lower intensity, more spread out pulse which is not detected by the threshold detector 38.

The known optical system of FIGS. 3-4 similarly has the disadvantage that in order for a given transmitting system Tj to communicate with a respective receiving system Rk, the phase shifted Fourier components associated with the receiving system Rk must be generated by the transmitting system Tj. Thus, random interconnections between a given transmitting system and a given receiving system are not possible. Moreover, transmitting system Tj encodes the entire spectral width of the mode locked laser source, resulting in considerable interference among the users that must be compensated by increasing the power level of the desired signal considerably above that of the undesired signals. As a result, the noise level of the desired signal is increased, thereby decreasing the signal-to-noise ratio of the system.

As a further alternative application of OCDMA, the encoding and decoding of optical pulses generated by a mode-locked laser source are carried out by modifying the relative spectral phases of the phase-locked frequencies of the optical pulses. Such systems are described in greater detail in the above-referenced U.S. application Ser. Nos. 11/062,090 (Telcordia APP No. 1554/TELCOR 3.0-010) and 11/048,394 (Telcordia APP No. 1548/TELCOR 3.0-003).

Figure 5:
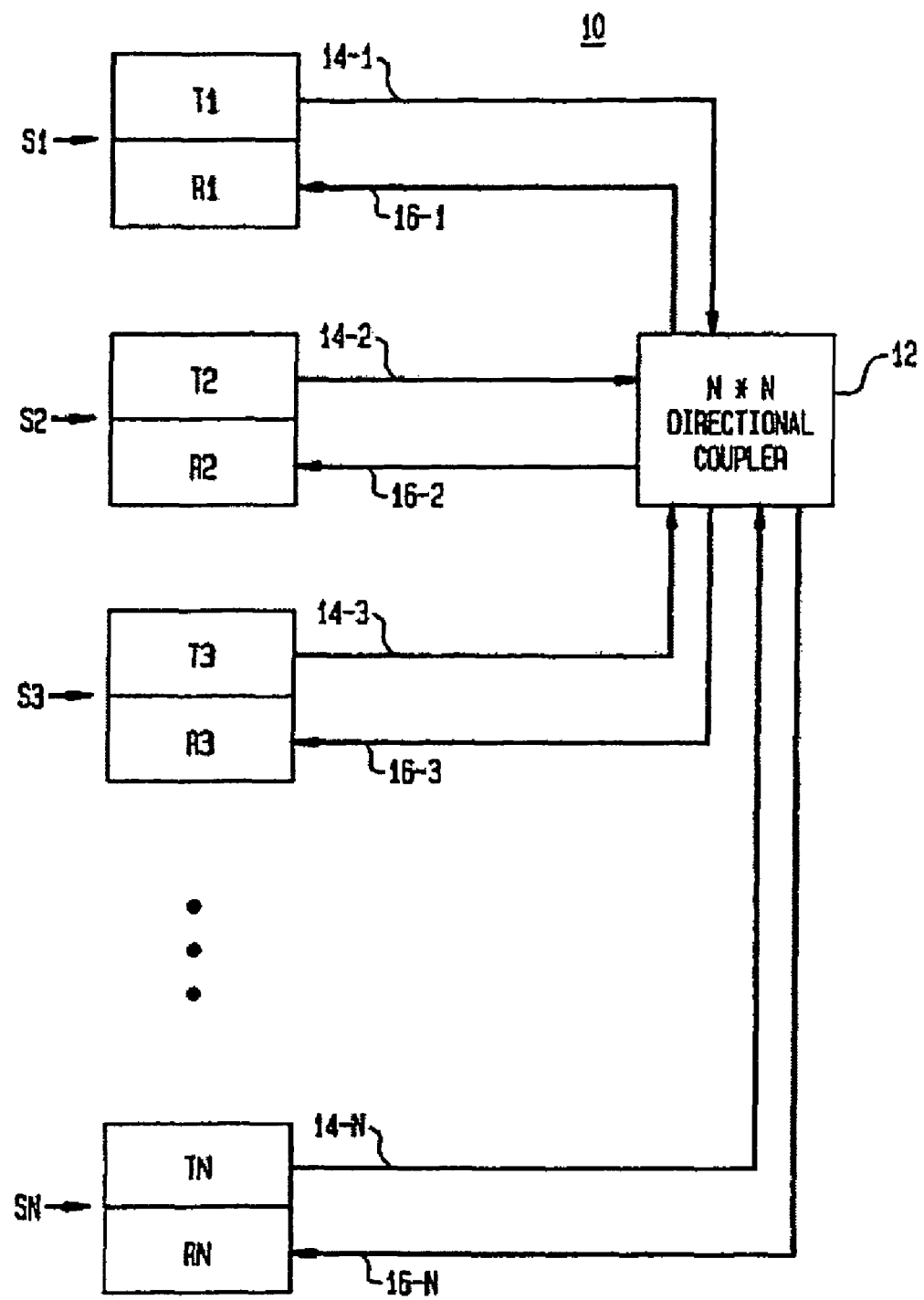
FIG. 5 is a block diagram showing another optical communications network that incorporates an OCDMA application.

FIG. 5 illustrates, in block diagram form, an example of an optical telecommunications network 10 that incorporates an application of OCDMA, such as is described in the above-referenced U.S. patent applications. The optical telecommunications network 10 provides communication among subscriber stations S1,S2,S3, . . . ,SN. Each subscriber station S1,S2,S3, . . . ,SN respectively includes a transmitting system T1,T2,T3, . . . ,TN and a receiving system R1,R2,R3, . . . ,RN. The network 10 also includes an N×N directional coupler or hub 12 which is preferably a passive element, such as a conventional star coupler. The hub 12 receives the optical power produced by each of the transmitting systems T1,T2, T3, . . . ,TN via associated fiber links 14-1,14-2, . . . ,14-N and transmits part or all of the optical power produced by each transmitting system to each of the receiving systems R1,R2, R3, . . . ,RN via associated fiber links 16-1,16-2, 16-3, . . . ,16-N. Alternatively, some of the subscriber stations may have a receiving system but no transmitting system, such as for a network adapted to handle a broadcast or a multicast in which one transmitting system transmits information to a specially selected plurality of such receiving systems.

Figure 6:
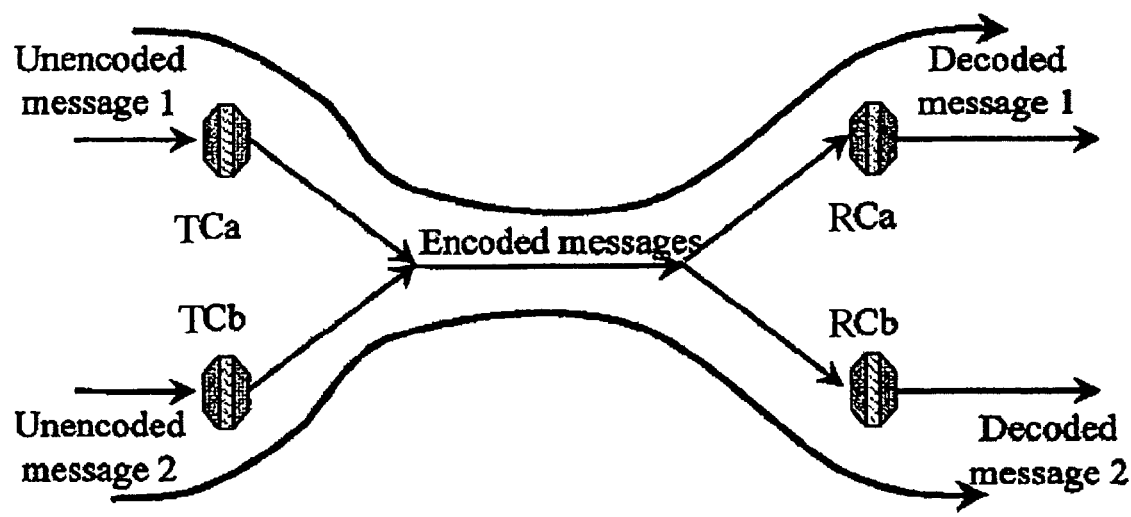
FIG. 6 is a diagram schematically illustrating the encoding, transmission and decoding of messages that is carried out by the optical communications network of FIG. 5.

FIG. 6 illustrates the encoding and decoding of messages carried out by the network of FIG. 5. Each of the transmitting systems T1,T2,T3, . . . ,TN shown in FIG. 5 includes a respective encoder, such as encoder TCa or encoder TCb shown in FIG. 6, and each of the receiving systems R1,R2, R3, . . . ,RN of FIG. 5 includes a respective decoder, such as decoder RCa or decoder RCb shown in FIG. 6. As an example, a first unencoded message is received at the encoder TCa and is encoded using a code that only the decoder RCa is able to decode, and a second unencoded message is received at encoder TCb and is the encoded using a code that only the decoder RCb is able to decode.

Each of the encoders TCa, TCb includes a mode-locked laser (not shown) that generates a train of short pulses having closely spaced, phase-locked frequencies wherein the frequency spacing is equal to the pulse repetition rate of the mode-locked laser. An optical bandpass filter (not shown), or the like, restricts the total spectral width of the pulses to within a specific window, e.g., 80 GHz. The train of pulses also has a pulse width that is inversely proportional to the spectral width of the window, e.g., a pulse width of 12.5 ps for the 80 GHz window. Thus, the window can be considered to be comprised of a plurality of phase-locked laser lines of equally spaced frequencies, for example, 16 laser lines of equally spaced frequencies for the 80 GHz window.

The encoders TCa, TCb spatially separate the phase-locked laser lines and then phase-shifts the separated laser lines using a spatial phase mask that corresponds to the particular phase values, preferably 0 or $\pi$, that are based on the particular coding to be applied, with each code being defined by a unique choice of phase shifts. The process of spatially separating the laser lines results in a spatial distribution that corresponds to the optical frequency spectrum of the signal, in other words, corresponds to performing a Fourier transform of the signal. Phase-shifting each frequency component of the signal corresponds to multiplying the Fourier transform of the signal by the spatial phase code. The encoders TCa, TCb then recombine the phase-shifted laser lines to produce a coded signal. The process of recombining the phase-shifted signal converts the spatially distributed signal to a temporal signal and hence corresponds to taking the Inverse Fourier transform of the phase-shifted signal. The shifting of the relative phases of the laser lines leaves the frequencies unaltered but results in a different temporal pattern when recombined, e.g., a pulse may be shifted to a different part of a bit period, multiple pulses may be shifted within a given bit period, or a noise-like distribution of optical power may result.

The codes that are used to define the phase shifts should efficiently use the spectrum within the window and should also be sufficiently separated from each other to attain acceptable error rates even when a maximum number of codes occupy the window. Preferably, a set of Hadamard codes or automorphisms thereof are used. The Hadamard codes are orthogonal to each other and have binary values so that the multi-user interference (MUI) is minimized and the encoded signal has a minimum or zero value when the decoded signal is at its maximum value. Moreover, as in the above example, the number of orthogonal Hadamard codes is typically greater than or equal to the number frequencies so that high spectral efficiency may be attained.

To apply the Hadamard codes to the phase-shifting of laser lines, the Hadamard codes are first converted to phase codes by assigning phase shifts of 0 and $\pi$, respectively, to +1 and −1 binary values of the Hadamard codes. Also, frequency bins are defined around the center frequencies of the laser lines so that the phase shift associated with a given laser lines frequency is applied to its entire bin.

When the laser lines are recombined to produce the coded signal, the phase-shifted frequency components are summed, namely, the modulated optical signal is convolved with the inverse Fourier transform of the phase code. The application of the Hadamard code results in a coded signal whose temporal pattern has minimal or no optical power where the uncoded pulse would have had maximum power (except for the Hadamard Code No. 1 which leaves all phases unchanged).

Mathematically, the electric field output m(t) of the moce-locked laser is a set of N equal-amplitude phase-locked laser lines:

$$m(t) = A \sum_{i=1}^{N} e^{j(2\pi f_i t + \phi)}, \quad (1)$$

where $f_i = f_o + (i-1)\Delta f$ are N equally spaced frequencies. The electric field m(t) is a periodic signal constituted of a train of pulses spaced $1/\Delta f$ seconds apart where each pulse has a width equal to $1/(N\Delta f)$ seconds. Equation (1) can also be expressed as:

$$m(t) = \sum_{k} p(t - kT), \quad (2)$$

where p(t) represents a pulse of duration $T=1/\Delta f$ whose energy is mostly confined in the main lobe of width $1/(N\Delta f)$.

In its idealized form, a hyperfine encoder for the user i acts as a phase-mask filter with a frequency response $E^{(i)}(f)$ defined by the relation:

$$E^{(i)}(f) = \sum_{j=1}^{N} c_j^{(i)} RECT_{\Delta f}(f - f_j), \quad (3)$$

where $c_j^{(i)}$ are complex symbols indicating the j-th element $(1 \leq j \leq N)$ of the i-th code $\underline{c}^{(i)}$ $(1 \leq i \leq M)$, and the function $RECT_W(f)$ denotes a rectangle function of unitary amplitude and width W defined as:

$$RECT_W(f) = \begin{cases} 1, & |f| < W/2 \\ 0, & \text{otherwise} \end{cases}. \quad (4)$$

Though, in principle, the elements of code $\underline{c}^{(i)}$ can be any complex value, a preferred phase mask only allows for unitary amplitude and binary phase values as follows:

$$c_j^{(i)} = e^{j\alpha_j^{(i)}}, \text{ with } \alpha_j^{(i)} \in \{0, \pi\} \Rightarrow c_j^{(i)} \in \{-1, 1\}. \quad (5)$$

Ideally, all the spectral components of the unencoded signal would emerge from the encoder unchanged in amplitude but, in some cases, flipped in phase. The effect of phase encoding is to spread in time the narrow mode-locked laser pulses of width $1/(N\Delta f)$ seconds across the whole bit-interval. Therefore, the preferred phase encoded OCDMA can be considered as a dual version of conventional direct sequence CDMA (DS-CDMA) based on frequency spreading.

Therefore, after modulation, the temporal expression of the signal pertaining to the i-th user can be expressed as follows:

$$b^{(i)}(t) = \sum_k a_k^{(i)} p(t - kT), \quad (6)$$

where $a_k^{(i)} \in \{0,1\}$ is the sequence of information bits of user i. After phase encoding:

$$s^{(i)}(t) = b^{(i)}(t) * e^{(i)}(t) = \sum_k a_k^{(i)} q^{(i)}(t - kT), \quad (7)$$

where $e^{(i)}(t) = FT^{-1}\{E^{(i)}(f)\}$ is the impulse response of the spectral phase encoder $E^{(i)}(f)$ as defined in equation (3); $FT^{-1}$ is the Inverse Fourier Transform (IFT) operator; and $q^{(i)}(t) = p(t) * e^{(i)}(t)$ represents the pulse shape of user i after encoding. The effects of the pulse output by the mode-locked laser may be omitted so that the shape of the pulse is governed by the phase mask.

The decoders RCa, RCb each decode the received coded signal using the Hadamard code assigned to that receiving system. Each of the Hadamard codes is its own complement so that the decoding operation carried out by each receiving system is essentially identical to the coding operations carried out by the transmitting system while generating the coded signal intended for that receiver. Thus, when one of the receiving systems decodes a coded signal using the same Hadamard code that was used by the transmitting system, the pulses are restored to their original position within the bit period and have their original pulse shape. Alternatively, when the receiving system decodes the coded signal using another Hadamard code, the decoded pulses have a temporal pattern having minimal or zero optical power at the center of the bit period so that the majority of the energy for each pulse is located outside the desired time interval. The receiving system may then employ optical time gating to separate the decoded signal intended for that receiving system from the decoded signals intended for the receiving systems of other subscriber stations.

Figure 7:
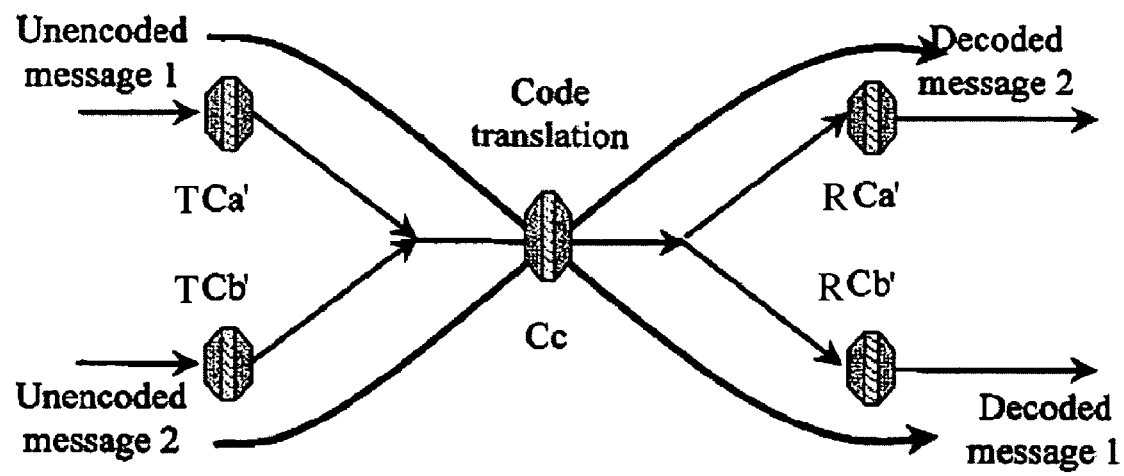
FIG. 7 is a diagram schematically illustrating an example of the encoding, translation and decoding of messages according to an embodiment of the invention.

The present invention provides an OCDMA network that permits random interconnections between two or more subscriber stations. Namely, the sending subscriber station need not generate coded signals that are decodable by the destination subscriber station, e.g., the transmitting system is not required to generate coded signals using the Hadamard code associated with the receiving system of the destination subscriber station in the manner described above with reference to FIGS. 5 and 6. Rather, as FIG. 7 shows, the encoder TCa',TCb' of one of the sending subscriber stations generates coded signals using another code, such as using a code specifically assigned to that encoder. The coded signals are transmitted and subsequently code shifted, also known as code translated, into further coded signals that are now decodable by the decoder RCa',RCb' of the intended one of the destination subscriber stations. The code translation may occur at a network hub Cc or at another location in the network.

As an example, code translation using the above-described Hadamard codes relies on the property that the set of Hadamard codes are a closed set under element-by-element multiplication, namely, the property that the multiplication of two such Hadamard codes results in another one of the set of Hadamard codes is relied on. A coded signal that is decodable using one of the Hadamard codes may be translated to a signal that is decodable using another of the Hadamard codes by applying a further one of the Hadamard codes to the coded signal. As a result, the coded signal generated by the encoder of any subscriber station may be converted to another coded signal that is decodable by the decoder of another subscriber station merely by translating the coded signal using the appropriate Hadamard code. In this manner, code shifting may be used to selectively route messages received from any subscriber station in a network to any other subscriber station in the network by converting the coded signal to one that is decodable by a given destination subscriber station. Though Hadamard codes are described here, the code translation may also be carried using automorphisms of the Haddamard codes, any other set of codes that is closed under multiplication, or any non-orthogonal set of codes having an encoding process that may be reversed.

Figure 8:
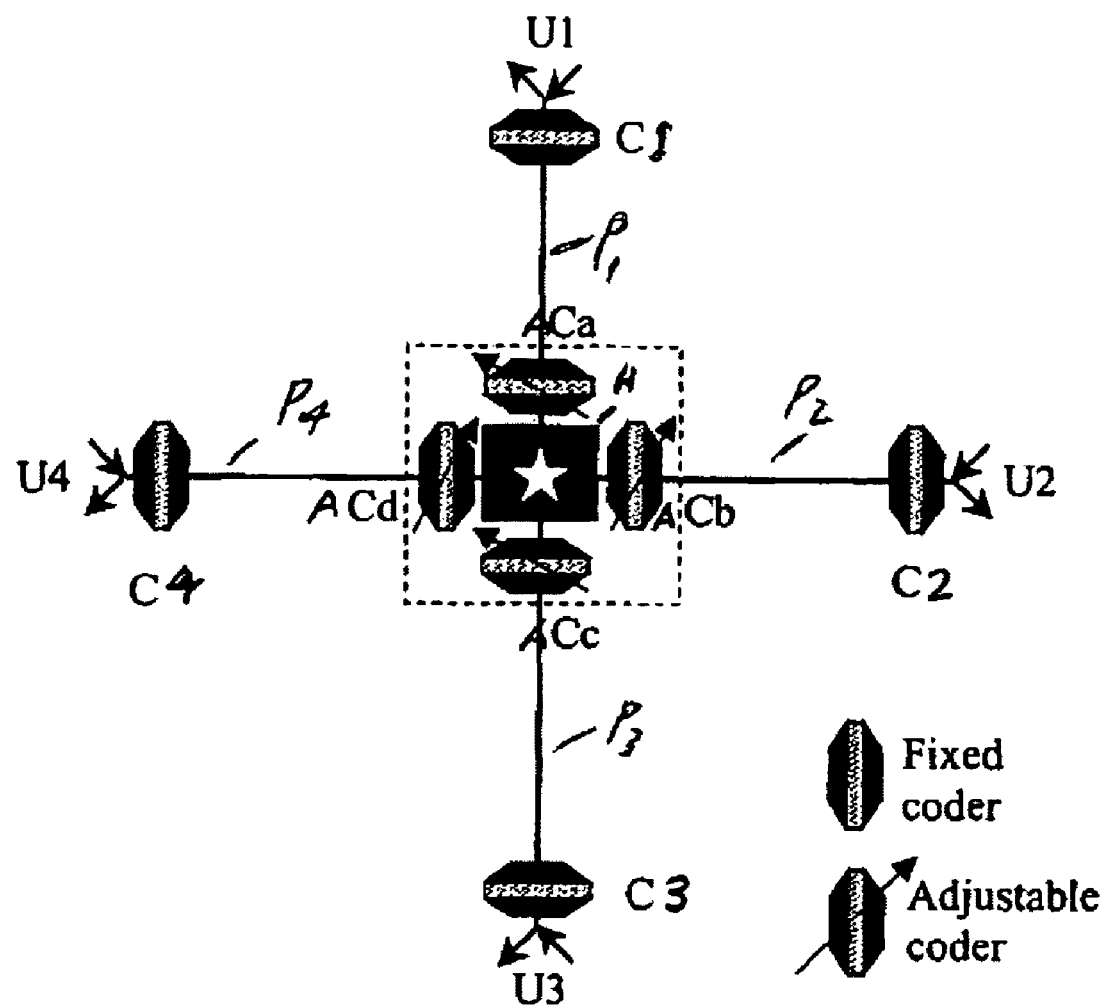
FIG. 8 is a block diagram showing an example of an optical communications network in accordance with a further embodiment of the invention.

FIG. 8 illustrates an example of an OCDMA network in accordance with an aspect of the present invention. The OCDMA network includes subscriber stations U1, . . . ,U4 each of which, for example, is assigned a unique one of the set of Hadamard codes. Each of the subscriber stations U1, . . . ,U4 includes an associated fixed coding encoder/decoder C1, . . . ,C4 that uses its assigned Hadamard code to encode signals that are to be transmitted to a central hub H as well as to decode encoded signals that are received from the central hub. The fixed coding encoder/decoders C1, . . . ,C4 may comprise separate encoder and decoder units or, alternatively, may comprise a single unit that functions as both an encoder and a decoder using, for example, direction-division multiplexing or time-compression multiplexing to separate the signals arriving in the two directions. Advantageously, each Hadamard code is its own complement so that essentially the same operation is performed for both encoding and decoding which permits the use of such single unit encoder/decoders. The encoder/decoder may be comprised of a free-space arrangement of a grating demultiplexor and Fourier optics to image the optical frequency spectrum onto a phase mask following which a reciprocal optics and grating multiplexor arrangement recollects the encoded signal (reference Brackett patent). Alternatively, a Virtually Imaged Phase-Array device can replace the grating demultiplexor and multiplexor [reference patent application 1554]. Also, an integrated array of micro-ring resonators can be employed in which each micro-ring resonator is configured to drop a selected (band of) frequencies from the signal, introduce a phase shift by means such as waveguide heaters, and recombine the phase-shifted frequencies to generate the encoded (or decoded) signal.

One or more adjustable coders ACa, . . . ,ACd are disposed within each of the optical paths P1, . . . ,P4 that connect the fixed coding encoders/decoders C1, . . . ,C4 to the central hub H. The adjustable coders ACa, . . . ,ACd may be co-located with the central hub H or may be disposed at other locations on the respective optical paths. Each of the adjustable coders ACa, . . . ,ACd receives coded signals that are generated and transmitted by the encoder/decoder located on the same optical path as the adjustable coder and intended for delivery to other encoder/decoders, and each adjustable coder receives coded signals generated by the other encoder/decoders that are intended for delivery to the encoder/decoder of its optical path. Each of the adjustable coders is also operable to translate the received coded signals into further coded signals that are decodable by the destination encoder/decoder. The code translation is carried out in the manner described above, e.g., by applying the appropriate Hadamard code to an already coded signal to then obtain a further coded signal that is decodable by the destination subscriber station using its assigned further Hadamard code. Preferably, the code translation is performed in a passive manner and is carried out using only optical elements, namely, the coded optical signals are not converted to electrical signals at any step of the code translation. The adjustable coder then sends the translated signals to the central hub for delivery the destination subscriber stations. Current embodiments of variable spectral phase encoders operate by a variety of mechanisms including physically switching in an entirely new spatial phase mask, incorporating a variable phase mask based on either mechanical adjustments of phase bins (via MEMs or other mechanical means) or by means of liquid crystal phase modulators, thermally adjusting the phase shifts between of integrated microring resonators to create new codes, or using a bank of N fixed coders and two 1:N optical switches (before and after the bank of coders).

The adjustable coders ACa, . . . ,ACd may be configured to provide bidirectional point-to-point communication between any pair of the subscriber stations U1, . . . ,U4. As an example, two-way communication is established between the subscriber station U1 and the subscriber station U2 shown in FIG. 8. One of the two adjustable coders ACa,ACb that are located in the path between the station U1 and the station U2 may be set to apply the appropriate Hadamard code needed to translate the coded signals generated by the encoder/decoder C1 of the subscriber station U1 into signals that are decodable by the encoder/decoder C2 of the subscriber station U2. The other one of the two adjustable coders Ca,Cb is thus set to apply Hadamard code 1 so that no translation occurs at that adjustable coder, i.e., the phases are unchanged. The same Hadamard code is also used by one of the two adjustable coders when translating coded signals sent in the opposite direction, namely, when translating coded signals generated by the encoder/decoder C2 of the subscriber station U2 into signals that are decodable by the encoder/decoder C1 of the subscriber station U1.

Similarly, when two-way communication is established between the subscriber station U3 and the subscriber station U4, one of the two adjustable coders ACc,ACd is set to apply the appropriate Hadamard code needed to translate the coded signals generated by the encoder/decoder C3 of the subscriber station U3 into further coded signals that are decodable by the encoder/decoder C4 of the subscriber station U4, and the other one of the two adjustable coders ACc,ACd is set to apply the Hadamard code 1. The same Hadamard code is also used to translate coded signals sent in the opposite direction.

Thus, only one of the two adjustable coders located in the path between a pair of subscriber stations (and only one of the 16 Hadamard codes) is needed to support two-way communication between a pair of subscriber stations. Similarly, to concurrently establish two-way communication between each of N pairs of subscriber stations, only N of the 2N adjustable coders (and only N Hadamard codes) are needed.

Alternatively, the adjustable coders ACa, . . . ,ACd may operate to provide single direction point-to-multipoint communication or bidirectional point-to-multipoint communication between one of the subscriber stations and two or more of the other subscriber stations. As an example, a multicast may be provided from the subscriber station U1 to the subscriber stations U2, U3, and U4. The adjustable coder ACa may be set to apply Hadamard code 1. The adjustable coder ACb is thus set to apply the appropriate Hadamard code needed to translate the coded signals generated by the encoder/decoder C1 of the subscriber station U1 into signals that are decodable by the encoder/decoder C2 of the subscriber station U2, the adjustable coder ACc is accordingly set to apply another particular Hadamard code to translate the coded signals generated by the coder/decoder C1 into signals that are decodable by the encoder/decoder C3 of the subscriber station U3, and the adjustable coder ACd is similarly set to apply yet another specific Hadamard code to translate the coded signals generated by the coder/decoder C1 into further coded signals that are decodable by the encoder/decoder C4 of the subscriber station U4. Other combinations of settings for the adjustable coders ACa, . . . ,ACd may also be provided to attain the same result.

Thus, any one of the subscriber stations in the network may communicate with any other subscriber station in the network without the need for the encoder/decoder of the transmitting subscriber station to encode the outgoing signals using the Hadamard code associated with the destination subscriber station. The encoder/decoder of each of the subscriber stations uses only the Hadamard code assigned to that subscriber station to encode or decode signals. Therefore, each subscriber station need only store the Hadamard code assigned to that subscriber station. As a result, none of the subscriber stations is able to eavesdrop or interfere with communication intended for another subscriber station. Additionally, when the adjustable coders ACa, . . . ,ACd are co-located with (or at least under common control with) the central hub H, the network operator that controls the central hub may also control the adjustable encoders, and thus the network operation may determine whether the signals that are destined for a given subscriber station are in a form that is decodable by that subscriber station. Only the control hub may store more than one Hadamard code, thereby further preventing eavesdropping or interference by the subscriber stations.

Figure 9:
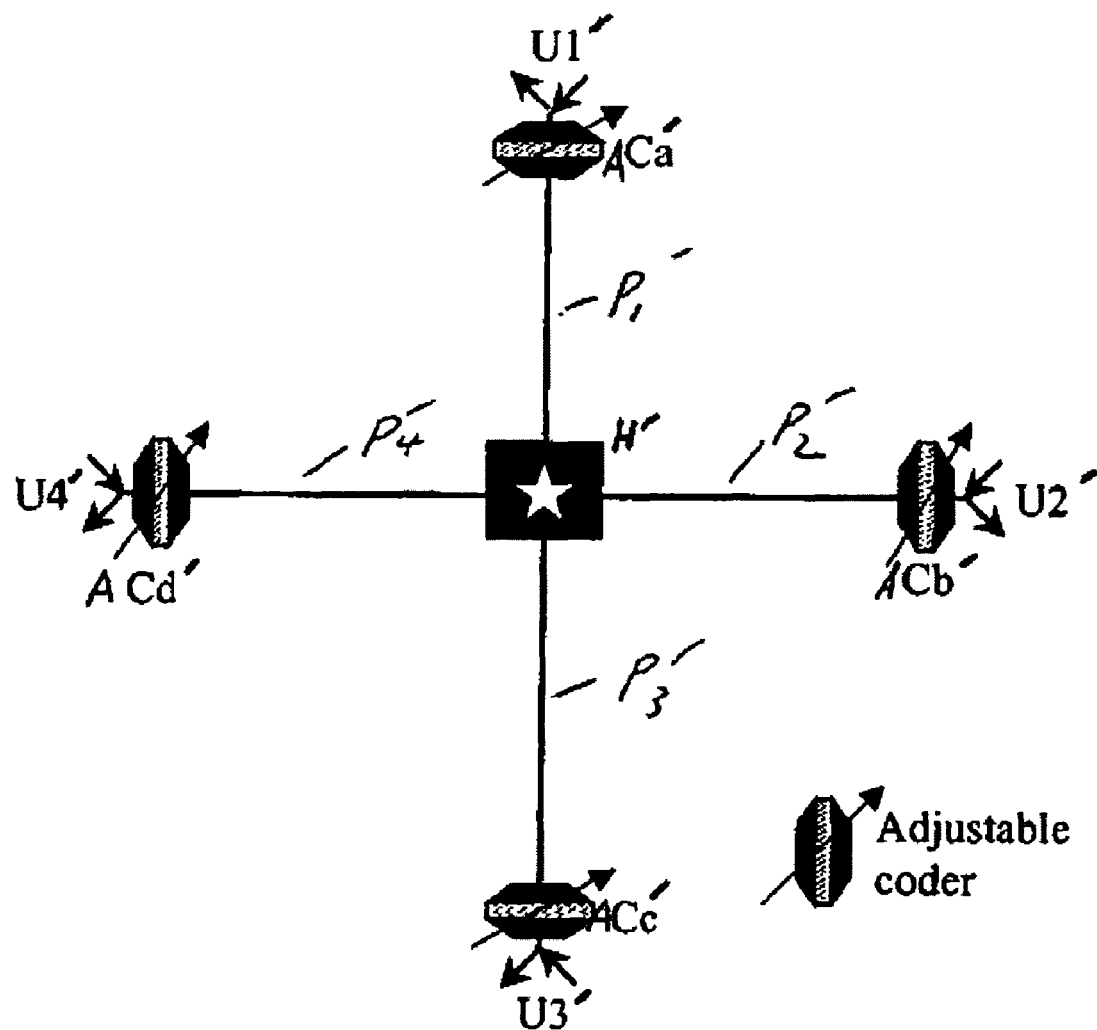
FIG. 9 is a block diagram showing an example of an optical communications network in accordance with another embodiment of the invention.

FIG. 9 illustrates another example of an OCDMA network in accordance with an alternative embodiment of the invention. Here, subscriber stations U1', . . . ,U4' are each assigned a unique Hadamard code in the manner described above. The subscriber stations U1', . . . ,U4', however, each include a corresponding adjustable encoder/decoder ACa', . . . ,ACd' in place of the non-adjustable encoder/decoders shown in FIG. 8. The adjustable encoder/decoders ACa', . . . ,ACd' are each "tunable" so that peer-to-peer communication may be carried out between any two of the subscriber stations U1', . . . ,U4'. The adjustable encoder/decoder of a first one of the subscriber stations may be tuned to encode signals using the Hadamard code assigned to a second one of the subscriber stations, and thus sends coded signals that are decodable by the second subscriber station. The first subscriber station may also decode coded signals generated by the second subscriber station using the Hadamard code assigned to the second station. Further, when the adjustable encoder/decoders ACa', . . . ,ACd' are comprised of separate encoders and decoders, one-way communication may be established by tuning only the encoder of the sending subscriber station to generate coded signals that are decodable by the receiving subscriber station or by tuning only the decoder of the receiving subscriber station to decode the coded signals generated by the sending subscriber station.

Tunable coders operate by changing their phase masks to "tune" to a new code. Ordinarily, networks with variable connectivity use tunable coders situated at the periphery of the network. Namely, the tunable encoders and/or the tunable decoders are located at the network periphery. However, because the network operates in a broadcast-and-select mode, the use of tunable decoders at the periphery (with either fixed or tunable encoders) allows for eavesdropping of transmissions. Moreover, the use of tunable encoders at the periphery (with fixed decoders) prevents the carrying out of a multicast operation and, when two transmitters attempt to send to the same receiver, code collisions result.

A feature of the present embodiment is that the end user encoders can be of fixed coding while an array of variable encoders at the center of the network can be adjusted such that arbitrary connectivity (both unicast and multicast) can be established among the end nodes. As a result, the transmissions are protected from eavesdropping, and multicast operation is possible without the occurrence of code collisions.

Figure 10:
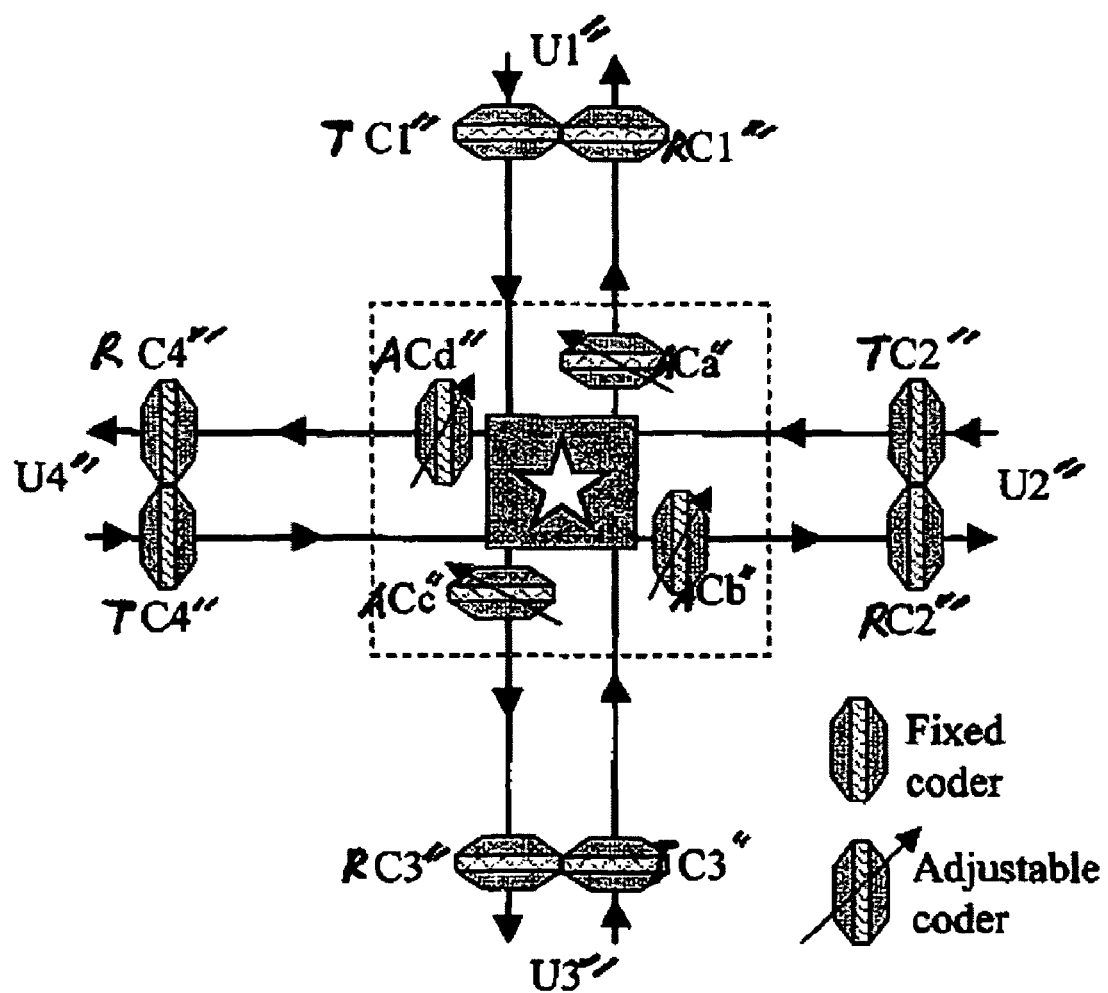
FIG. 10 is a block diagram showing an example of an optical communications network in accordance with a still further embodiment of the invention.

FIG. 10 shows an alternative embodiment to that shown in FIG. 8 in that transmission is carried over a pair of optical fibers rather than over the single optical fiber used in FIG. 8. Each of the subscriber stations U1", . . . ,U4" includes an associated fixed encoder TC1", . . . ,TC4" that encodes messages using the Hadamard code assigned to the subscriber station and then transmits the encoded message over a first optical fiber to a central hub H". Each subscriber station also includes an associated decoder RC1", . . . ,RC4" that receives encoded messages over a second optical fiber and decodes them using either the same Hadamard code that is assigned to the encoder of that station or using another Hadamard code that is assigned only to the decoder of the subscriber station. The central hub H" includes respective adjustable encoders/decoders ACa", . . . ,ACd" that operate in the same manner as the adjustable encoder/decoders of FIG. 8. Here, however, each encoder/decoder is connected to only one of the two optical fibers so that each message passes through only one adjustable encoder/decoder.

Though the present invention is described using signals that are coded and decoded using Hadamard codes, the invention is similarly applicable using other codes that are a closed set under multiplication to code the signals or using non-orthogonal codes that are reversible. Further, the invention is applicable even when the coding and decoding operators are not their own complements. In such a case, each subscriber station includes separate encoders and/or decoders in place of the encoder/decoder described above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of providing communication between a plurality of transmitting stations and a plurality of receiving stations, said method comprising:

receiving a plurality of signals from a plurality of transmitting stations, a signal from a first one of the plurality of transmitting stations, being coded using a first code that is associated with the first one of the plurality of transmitting stations;

converting the plurality of coded signals to obtain a further plurality of coded signals one of which is decodable using a further code that is associated with at least one of the plurality of receiving stations;

transmitting the plurality of further coded signals for delivery to the at least second one of the plurality of receiving stations, and receiving at the one of the plurality of stations the further coded signal, wherein the first code is one of a plurality of codes where each first code is uniquely associated with one of the plurality of transmitting stations, the further code is another of the plurality of codes, the plurality of codes is a closed set under element-by-element multiplication whereby element-by-element multiplication of the first code by a specific one of the plurality of codes results in the further code, and said converting step includes converting the coded signal using the specific one of the plurality of codes to obtain the further coded signal.

2. A method according to claim 1, wherein the plurality of codes is selected from the group consisting of: the set of Hadamard codes, and automorphisms of the set of Hadamard codes.

3. A method of providing communication between a plurality of transmitting stations and a plurality of receiving stations, said method comprising:

receiving a plurality of signals from a plurality of transmitting stations, a signal from a first one of the plurality of transmitting stations being coded using a first code that is uniquely associated with the first one of the plurality of transmitting stations;

converting the plurality of coded signals to obtain a further plurality of coded signals one of which is decodable using a further code that is associated with at least one of the plurality of receiving stations;

transmitting the plurality of further coded signals for delivery to the at least one of the plurality of receiving stations, and receiving at the one of the plurality of receiving stations the further coded signal, wherein the first code and the further code are orthogonal codes, and the coded signal and the further coded signal are code division multiple access (CDMA) signals.

4. A method of providing communication between a plurality of transmitting stations and a plurality of receiving stations, said method comprising:

receiving a plurality of signals from a plurality of transmitting stations, a signal from a first one of the plurality of transmitting stations being coded using a first code that is uniquely associated with the first one of the plurality of transmitting stations;

converting the plurality of coded signals to obtain a further plurality of coded signals one of which is decodable using a further code that is associated with at least one of the plurality of receiving stations;

transmitting the plurality of further coded signals for delivery to the at least one of the plurality of receiving stations, and receiving at the one of the plurality of receiving stations the further coded signal, wherein the coded signal and the further coded signal are modulated optical signals formed of optical pulses comprised of a plurality of discrete frequencies within a specific range of frequencies, and said converting step includes changing the phase of at least one of the plurality of discrete frequencies in the optical pulses of the coded signal to obtain the further coded signal.

5. A method of providing communication between a plurality of transmitting stations and a plurality of receiving stations, said method comprising:

receiving a plurality of signals from a plurality of transmitting stations, a signal from a first one of the plurality of transmitting stations being coded using a first code that is uniquely associated with the first one of the plurality of transmitting stations;

converting the plurality of coded signals to obtain a further plurality of coded signals one of which is decodable using a further code that is associated with at least one of the plurality of receiving stations;

transmitting the plurality of further coded signals for delivery to the at least one of the plurality of receiving stations, and receiving at the at least one of the plurality of receiving stations the further coded signal, further comprising: decoding the further coded signal at the one of the plurality of stations using the further code.

6. An apparatus for providing communication between at a plurality of transmitting stations and a plurality of receiving stations, said apparatus comprising:

an adjustable coder operable to receive a plurality of signals from a plurality of transmitting stations, a signal from a first one of the plurality of transmitting stations being coded using a first code that is associated with the first one of the plurality of transmitting stations, to convert the coded signal to obtain a plurality of further coded signals that is decodable using a further code that is associated with at least one of the plurality of receiving stations, to transmit the plurality of further coded signals for delivery to the at least one of the plurality of receiving stations, wherein the first code is one of a plurality of codes where each first code is uniquely associated with one of the plurality of transmitting stations, the further code is another of the plurality of codes, the plurality of codes is a closed set under element-by-element multiplication whereby element-by-element multiplication of the first code by a specific one of the plurality of codes results in the further code, and said adjustable coder operable to convert the coded signal using the specific one of the plurality of codes to obtain the further coded signal.

7. An apparatus according to claim 6, wherein the plurality of codes is selected from the group consisting of: the set of Hadamard codes, and automorphisms of the set of Hadamard codes.

8. A communication system, comprising:
a plurality of transmitting stations;
a plurality of receiving stations;
a central hub;
a plurality of communication paths each associated with a given one of said plurality of transmitting stations and being operable to connect that station with said central hub, said central hub being operable to provide a connection between the given one of said plurality of transmitting stations and said plurality of receiving stations via the associated communication paths; and
a plurality of adjustable coders each associated with a specific one of said plurality of transmitting stations and said plurality of receiving stations and being disposed in said communication path between that transmitting station, said receiving station, and said central hub, at least one of said plurality of adjustable coders being an apparatus according to claim 6.

9. A communication system according to claim 8, wherein said first one of said plurality of transmitting stations is operable to generate the coded signal using the first code, and said one of said plurality of receiving stations is operable to decode the further coded signal using the further code.

10. A communication system according to claim 8, wherein the first code is one of a plurality of codes, the further code is another of the plurality of codes, the plurality of codes is a closed set under element-by-element multiplication whereby element-by-element multiplication of the first code by a specific one of the plurality of codes results in the further code, and said adjustable coder operable to convert the coded signal using the specific one of the plurality of codes to obtain the further coded signal.

11. A communication system according to claim 10, wherein the plurality of codes is selected from the group consisting of: the set of Hadamard codes, and automorphisms of the set of Hadamard codes.

12. A communication system according to claim 8, wherein the first code and the further code are orthogonal codes, and the coded signal and the further coded signal are code division multiple access (CDMA) signals.

13. A communication system according to claim 8, wherein the coded signal and the further coded signal are modulated optical signals formed of optical pulses comprised of a plurality of discrete frequencies within a specific range of frequencies, and said adjustable coder is operable to convert the coded signal by changing the phase of at least one of the plurality of discrete frequencies in the optical pulses of the coded signal to obtain the further coded signal.

14. An apparatus for providing communication between a plurality of transmitting stations and a plurality of receiving stations, said apparatus comprising:

an adjustable coder operable to receive a plurality of signals from a plurality of transmitting stations, a signal from a first one of the plurality of transmitting stations being coded using a first code that is uniquely associated with the first one of the plurality of transmitting stations, to convert the coded signal to obtain a plurality of further coded signals that is decodable using a further code that is associated with at least one of the plurality of receiving stations, to transmit the plurality of further coded signals for delivery to the one of the plurality of receiving stations, wherein the first code and the further code are orthogonal codes, and the coded signal and the further coded signal are code division multiple access (CDMA) signals.

15. An apparatus for providing communication between a plurality of transmitting stations and a plurality of receiving stations, said apparatus comprising:

an adjustable coder operable to receive a plurality of signals from a plurality of transmitting stations, a signal from a first one of the plurality of transmitting stations being coded using a first code that is uniquely associated with the first one of the plurality of transmitting stations, to convert the coded signal to obtain a plurality of further coded signals that is decodable using a further code that is associated with at least one of the plurality of receiving stations, to transmit the plurality of further coded signals for delivery to the at least one of the plurality of receiving stations wherein the coded signal and the further coded signal are modulated optical signals formed of optical pulses comprised of a plurality of discrete frequencies within a specific range of frequencies, and said adjustable coder is operable to convert the coded signal by changing the phase of at least one of the plurality of discrete frequencies in the optical pulses of the coded signal to obtain the further coded signal.

16. A communication system, comprising:
a plurality of transmitting stations, at least one of said plurality of transmitting stations including a coder for uniquely coding signals using a first code;
a plurality of receiving stations at least one of said plurality of receiving stations including a decoder for decoding signals using a further code;
a central hub having a plurality of variable encoders associated with each of said receiving stations; and
a plurality of communication paths each associated with a given one of said plurality of transmitting stations and being operable to connect that station with said central hub, said central hub being operable to provide a connection between said at least one of said plurality of transmitting stations and said plurality of receiving stations via the associated communication paths;

wherein said hub receives a plurality of first coded signals from said transmitting stations and converts via the variable encoder the plurality of first coded signals to a plurality of further coded signals one of which is associated with the decoder at one of said receiving stations.

17. A communication system according to claim 16, wherein the first code is selected from the group consisting of: the set of Hadamard codes, and automorphisms of the set of Hadamard codes; the further code is another code selected from the group consisting of: the set of Hadamard codes, and automorphisms of the set of Hadamard codes; the set of Hadamard codes and automorphisms of the set of Hadamard codes each being a respective closed set under element-by-element multiplication whereby element-by-element multiplication of the first code by a specific one of the set of Hadamard codes or automorphisms of the set of Hadamard codes results in the further code, and the coded signal and the further coded signal are code division multiple access (CDMA) signals.

18. A communication system according to claim 16, wherein the coded signal and the further coded signal are modulated optical signals formed of optical pulses comprised of a plurality of discrete frequencies within a specific range of frequencies, said adjustable coder is operable to generate the coded signal by changing the phase of at least one of the plurality of discrete frequencies in the optical pulses of an non-coded signal, and said adjustable decoder is operable to decode the further coded signal by changing the phase of at least one of the plurality of discrete frequencies in the optical pulses of the further coded signal.

* * * * *